(12) United States Patent
Schläpfer et al.

(10) Patent No.: US 12,162,067 B2
(45) Date of Patent: Dec. 10, 2024

(54) DIE CASTING MACHINE HAVING IMPROVED MOUNTING PLATE

(71) Applicant: Bühler AG, Uzwil (CH)

(72) Inventors: Elias Schläpfer, Dozwil (CH); Raphael Walker, Winterthur (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 18/264,379

(22) PCT Filed: Feb. 4, 2022

(86) PCT No.: PCT/EP2022/025043
§ 371 (c)(1),
(2) Date: Aug. 4, 2023

(87) PCT Pub. No.: WO2022/171362
PCT Pub. Date: Aug. 18, 2022

(65) Prior Publication Data
US 2024/0042516 A1     Feb. 8, 2024

(30) Foreign Application Priority Data
Feb. 11, 2021 (EP) .................................... 21156644

(51) Int. Cl.
*B22D 17/22* (2006.01)
*B29C 45/17* (2006.01)

(52) U.S. Cl.
CPC .......... *B22D 17/22* (2013.01); *B29C 45/1744* (2013.01)

(58) Field of Classification Search
CPC ...... B22D 17/22; B22D 17/26; B29C 45/1744
See application file for complete search history.

(56) References Cited

U.S. PATENT DOCUMENTS

| | | |
|---|---|---|
| 2007/0235898 A1 | 10/2007 | Spicer et al. |
| 2008/0175938 A1 | 7/2008 | Teng et al. |
| 2011/0200701 A1 | 8/2011 | Link |
| 2016/0031139 A1 | 2/2016 | Shioiri et al. |

FOREIGN PATENT DOCUMENTS

| | | | | |
|---|---|---|---|---|
| EP | 2792465 A1 | 10/2014 | | |
| EP | 3597391 A1 | 1/2020 | | |
| JP | 2003025378 A | * 1/2003 | ......... | B29C 45/1744 |
| JP | 2005144802 A | 6/2005 | | |
| JP | 2013244740 A | 12/2013 | | |
| KR | 1020180010551 A | * 1/2018 | ......... | B29C 45/1744 |
| WO | 2008/131571 A1 | 11/2008 | | |

* cited by examiner

*Primary Examiner* — Kevin E Yoon
(74) *Attorney, Agent, or Firm* — Colson Law Group, PLLC

(57) ABSTRACT

The present invention relates to a mounting plate, in particular a fixed mounting plate, for a die-casting machine, wherein the mounting plate has a dome-shaped cavity, the base of which is in the second side of the mounting plate and is open and which tapers towards the centroid of the receiving openings on the first side. The present invention further relates to a die-casting machine having such a mounting plate.

15 Claims, 6 Drawing Sheets

DIE CASTING MACHINE HAVING IMPROVED MOUNTING PLATE

Figure 1A:
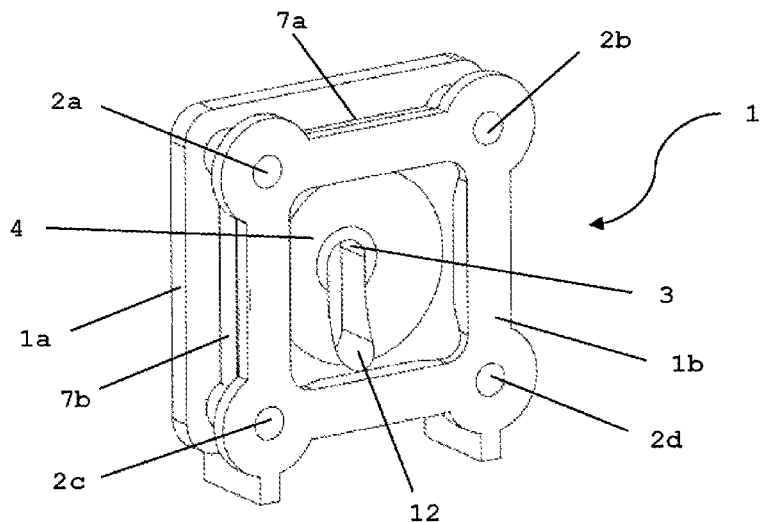

The present invention relates to a mounting plate for a die-casting machine and to a die-casting machine having a corresponding mounting plate.

In recent years, in particular in the automotive sector, there has been a trend towards structural components of increasing size. In addition, structural components for 5G antennas and battery housings for electrically operated vehicles are increasingly in demand.

Structural components of this kind are produced by die-casting. The die-casting process and the die-casting machines required for this purpose are well known (see, for example, Brunhuber, Praxis der Druckgussfertigung, Berlin, 3rd edition 1980).

Due to the aforementioned increasing demand for structural components, there is a need for larger dimensioned die-casting machines with an increased closing force, preferably of more than 45 000 kN. This also requires a corresponding increase in the dimensions of the mounting plates so that they can withstand without deformation the high forces acting on them.

Manufacturing mounting plates is time-consuming and costly as their size increases. In addition, there is a significant increase in the weight of the die-casting machine. Furthermore, in the case of the fixed mounting plate, there is the problem that the casting opening that is necessarily present in the plate becomes less accessible as the thickness and compactness of the fixed mounting plate increase.

Consideration has already been given in the prior art to reducing the weight of mounting plates by making the mounting plates less compact. This concept has been proposed primarily for injection-molding machines because the forces acting on the mounting plates in the injection-molding process are lower than in the die-casting process, and accordingly the mounting plates need to be less robust.

US 2007/0235898 A1 describes a casting plate system consisting of two separate plates in which a front plate is connected in its central portion to a rear plate via a component, for example a conical component. To prevent deformation, additional struts are provided that connect the respective corners of the front and rear plates.

EP-3 597 391 A1 describes an analogous casting plate system consisting of two separate plates in which a front plate is connected at its corners via coupling sections in order to couple guide columns to a rear plate. A cylindrical rib for connecting the two plates is provided centrally. Reinforcing struts extend from the cylindrical rib diagonally to the coupling sections and vertically upwards and downwards.

US 2011/0200701 A1 describes a movable mounting plate for an injection-molding machine in which the sleeves for the guide columns, which sleeves are arranged at the corners on the rear side of the plate, are connected by walls for the purpose of reinforcement. As a result, an interior space is formed on the rear side and outside the plate in order to create space for an ejection cylinder.

The systems described above are not suitable for large die-casting machines with their enormous closing forces of more than 45 000 kN.

The object of the present invention has been to provide a die-casting machine having at least one mounting plate, which has a lower weight than conventional mounting plates but can still be used for a long time in larger die-casting machines and, in the case of a fixed mounting plate, allows easier access to the casting opening.

The above object is achieved by the mounting plate and die-casting machine defined in the claims.

In detail, the present invention relates to a mounting plate, in particular a fixed mounting plate, for a die-casting machine, comprising:
 a first side and a second side, wherein a casting mold can be arranged on the first side,
 receiving openings for guide columns that are arranged in the corners of the mounting plate,
 characterized in that the mounting plate has a dome-shaped cavity, the base of which is located in the second side of the mounting plate and is open and which tapers towards the centroid of the receiving openings on the first side.

Diecasting machines are well-known and do not need to be described in detail here. These machines can be used to produce molded parts in a casting mold, wherein the casting mold usually consists of two casting mold halves that together define the outer contours of the molded part to be produced. In each case, one casting mold part, usually a casting mold half, is located on a fixed mounting plate and one on a movable mounting plate.

Diecasting machines are used to produce metallic castings such as, for example, engine blocks.

According to the invention, the die-casting machine is preferably a two-platen die-casting machine or a three-platen die-casting machine, preferably a two-platen die-casting machine. These types of die-casting machines are well-known. The applicant produces, inter alia, two-platen die-casting machines under the tradename CARAT®.

By way of example, WO 2008/131571 A1 describes a horizontal two-platen die-casting machine. This two-plate die-casting machine comprises a movable mounting plate (MMP) and a fixed mounting plate (FMP), on each of which a casting mold half is arranged. The die-casting mold can be opened and closed by moving the movable mounting plate on a machine bed by force transmission means. In the closed position, the two mounting plates are pressed firmly against one another so that the two casting mold halves form a closed hollow mold. A molten metal is introduced into the closed mold under pressure and cooled as it solidifies. The solidified casting can be removed after opening the mold (by moving the movable mounting plate). In the machine according to WO 2008/131571 A1, the movable mounting plate is moved via guide columns, preferably four guide columns.

According to the invention, the closed position is the maximum position of the movable mounting plate that the movable mounting plate can assume during a movement in the direction of the fixed mounting plate before its further movement is prevented by the fixed mounting plate. According to the invention, the closing direction is a movement of the movable mounting plate in the direction of the fixed mounting plate. According to the invention, the opening direction is a movement of the movable mounting plate away from the fixed mounting plate. According to the invention, the opening position is the maximum position of the movable mounting plate that the movable mounting plate can assume due to its design in the course of a movement in the direction away from the fixed mounting plate.

Material for producing the desired molded body can be introduced into the hollow (casting) mold (also referred to as cavity or mold contour). In the die-casting process, these are molten metals, such as aluminum or molten metal alloys, which are pressed into the mold under pressure by means of a casting cylinder of a casting unit through a casting opening provided in the fixed mounting plate. To prevent the mold from opening under these loading conditions, the movable mounting plate is held in its closed position by means of a locking cylinder and by clamping cylinders fastened to the guide columns. After the material solidifies in the mold, the mold is opened by moving the movable mounting plate in the opening direction and the finished molded part can be removed. For example, the finished cast component can be ejected with the aid of ejectors.

A distinction is made between a cold-chamber and a hot-chamber die-casting machine. In a hot-chamber die-casting machine, the casting container of a casting unit is held in a crucible with molten metal. A casting piston moves into the casting container and presses the molten metal into the casting mold through a casting container likewise arranged at least in part within the crucible and a casting opening provided in the fixed mounting plate. The casting container and casting piston are permanently exposed to the molten metal in this method. The casting unit of a hot-chamber die-casting machine is fundamentally different from that of a cold-chamber die-casting machine. In the case of a cold-chamber die-casting machine, the metal is melted in a separate device or is kept warm in the molten state. The amount of molten metal required to produce the desired component is introduced into a cold casting chamber of a casting unit via a filling opening and is pressed into the casting mold through a casting opening provided in the fixed mounting plate by means of a casting piston movably arranged in the casting chamber.

Cold-chamber and hot-chamber die-casting machines are sufficiently known to a person skilled in the art.

In a conventional die-casting machine, the movable mounting plate is guided by 4 (four) guide columns that are detachably arranged at the corners of the fixed mounting plate and are guided through receiving openings in the corners of the movable mounting plate. In order to provide sufficient access to the region between the fixed and the movable mounting plates for possible replacement of the casting mold, at least the two upper guide columns are preferably arranged such that they can be pulled out of the fixed mounting plate. Column extraction devices are known and need not be explained in greater detail here. For example, reference is made to column extraction devices as described in WO 2008/131571 A1 or EP-2 792 465 A1.

The guide columns are detachably connected to the fixed mounting plate. According to the invention, the fastening device required for this purpose for detachable connection to a guide column can be provided in a known manner by means of suitable coupling connections, as are described in the prior art. By way of example, a two-part nut may be mentioned, i.e., a nut having two separate halves that can be moved away from or towards the column, for example by means of a hydraulic drive. In order to fix the guide column in the fixed mounting plate, the two halves of the nut are pressed together, as a result of which a form-fitting connection is formed between the nut thus formed and the guide column. The fastening device for detachable connection to a guide column is preferably arranged on a corner of the fixed mounting plate on the side facing away from the movable mounting plate. Particularly preferably, such a fastening device for detachable connection to a guide column is arranged in each corner of the fixed mounting plate on the side facing away from the movable mounting plate.

During normal molding operation of the die-casting machine (molding machine) according to the invention, the guide columns are fixedly connected to the fixed mounting plate by means of the fastening device described above for detachable connection to a guide column. This connection is only detached when the column is pulled out in order to replace the mold.

A further fastening device for detachable connection to a guide column, which is described in detail below, can be arranged on the movable mounting plate of the die-casting machine according to the invention, preferably on a corner on the side facing away from the fixed mounting plate, as a component of a column pull-out device. Because, as explained above in the case of a die-casting machine having four guide columns, the two upper guide columns are to be pulled out of the region between the fixed and movable mounting plates to replace the mold, such fastening devices are preferably arranged at least on the two upper corners of the movable mounting plate for detachable connection to a guide column. However, it is of course possible to provide such fastening devices for detachable connection to a guide column at all corners of the movable mounting plate on the side facing away from the fixed mounting plate in order to allow all guide columns to be pulled out of the die-casting machine.

The fastening device arranged on the movable mounting plate for detachable connection to a guide column of the column extraction device can be realized in a manner known from the prior art. A coupling with which a form-fitting or force-fitting connection to the guide column can be selectively produced is preferred.

Guide columns conventionally used in die-casting machines have grooves in the portion in which they come into contact with the movable mounting plate during normal molding operation of the machine. These grooves serve to produce as firm a connection as possible between the movable mounting plate and the guide column. In particular during the casting operation of a die-casting machine, enormous loads occur as described above, under which the mold must be held reliably closed. For this purpose, a form-fitting coupling is made with the guide column by means of the fastening device arranged on the movable mounting plate. Preferably, a two-part nut is used for this purpose, i.e., a nut having two separate halves that can be moved away from or towards the guide column, for example by means of a hydraulic drive. The inner surfaces of the nut halves that come into contact with the guide column have grooves that can interact in a form-fitting manner in contact with the grooves on the column surface. In other words, a form-fitting connection can be produced by an elevation between two grooves on the inner surface of the nut halves engaging in a groove on the column surface, and vice versa. In order to fix the guide column in the movable mounting plate, the two halves of the nut are pressed together, as a result of which the above-described form-fitting connection is formed between the nut thus formed and the guide column. Of course, the form-fitting connection between the guide column and the movable mounting plate can also be achieved in another known manner different from the grooves described above. However, the embodiment described above is preferred according to the invention.

During the normal molding operation of the die-casting machine according to the invention, the movable mounting plate is moved on the guide columns by releasing the above-described form-fitting coupling, as a result of which the movable mounting plate can be moved by means of a conventional drive on a machine frame in the closing direction or opening direction. In order to fix the movable mounting plate in a desired position, the form-fitting coupling described above is made with the guide column.

As stated above, the production of large castings requires a high closing force during the casting process. This requires a corresponding increase in the dimensions of the die-casting machine, in particular of the mounting plates. However, the production of such large mounting plates is time-consuming and costly. A movable mounting plate required for a die-casting machine having a closing force of more than 45 000 kN has a weight of approximately 100 t and takes approximately 10 weeks to manufacture. The mounting plates are correspondingly thick, which makes it difficult to access the casting opening present in the fixed mounting plate. Usually, at least one opening is also provided in the movable mounting plate through which an ejection unit can be guided to eject a casting part located in the casting mold. The accessibility of this opening in the movable mounting plate is also made more difficult by the dimensions of this mounting plate required for high closing forces.

The present invention solves the problems associated therewith by reducing the weight of the mounting plates of the die-casting machine according to the invention as far as possible.

According to the invention, this is achieved in that the mounting plate has a dome-shaped cavity, the base of which is located in the second side (i.e., the side facing away from the casting mold) of the mounting plate and is open and which tapers towards the centroid of the receiving openings on the first side.

A centroid (also referred to as the geometric center of gravity) of a figure is a particularly prominent point that is interpreted as a type of center. Mathematically, this is equivalent to averaging all the points in the figure.

According to the invention, the first side of the mounting plate has a substantially square shape. The receiving openings for the guide columns are arranged in the corners of the first side. The centroid on the first side of the mounting plate can be determined in a known manner by drawing in the axes of symmetry between the receiving openings. The centroid is located at the intersection of the axes of symmetry.

According to the invention, "dome-shaped" is understood to mean a cup-like shape. Such a shape can be formed by a section of a ball body along a plane placed through the body (referred to as a spherical dome). According to the invention, a dome-shaped shape is preferably an intermediate shape between a spherical dome and a cone (a cone or truncated cone). In other words, the dome-shaped cavity preferably has a flattened tip portion, in the center of which the above-described centroid of the receiving openings is located.

The base of the dome-shaped cavity is located in the second side (i.e., the side facing away from the casting mold) of the mounting plate and is open. This provides excellent access to the cavity, in particular to an opening located in the tip portion of the cavity, such as a casting opening (in the case of a fixed mounting plate) or at least one opening for an ejection unit (in the case of a movable mounting plate).

Preferably, the open base of the dome-shaped cavity is square or rectangular and comprises an area in the range of 30% to 70%, more preferably 33% to 65%, particularly preferably 40% to 60%, of the total area of the second side of the mounting plate.

Preferably, the distance from the center of a receiving opening to the closest vertical inner side of the dome-shaped cavity is 5-30% of the distance between a center line extending through the centroid of the receiving openings and the center of the receiving opening.

As described above, the dome-shaped cavity tapers from its base in the second side of the mounting plate towards the centroid of the receiving openings on the first side. In order to ensure an optimal flow of force through the mounting plate from the fastening devices of the guide columns to the casting mold, the tip portion of the cavity should not fall below a certain minimum size. According to the invention, the dome-shaped cavity preferably has a minimum length and minimum width of a theoretical rectangle in the region of the first side of the mounting plate that corresponds to the minimum length and minimum width of a smallest permissible casting mold fastened to the first side of the mounting plate. However, it should be noted that the flattened tip portion of the dome-shaped cavity does not actually have to be rectangular, but can also be, for example, circular or elliptical with a surface corresponding to the theoretical rectangular surface.

Depending on the size of a die-casting machine, casting molds of various sizes can be used. In this case, the closing force provided by the die-casting machine as well as the molding force occurring in the casting mold during the casting process must be taken into account. To prevent the mold from deforming during the casting process, the mold must have a defined minimum length and width. This mass depends on the dimensions of the die-casting machine and cannot be given in general terms. Usually, the theoretical rectangle of the tip portion of the dome-shaped cavity in the region of the first side of the mounting plate has an area in the range of 15-40%, preferably 20-35% of the total area of the first side of the mounting plate.

According to the invention, there is a continuous transition from the base to the tip portion of the dome-shaped cavity. In other words, the inner walls of the dome-shaped cavity have no steps or other discontinuous portions. In particular, all inner wall portions of the dome-shaped cavity have the same curvature.

According to the invention, the dome-shaped cavity has a depth that is 50-80%, more preferably 55-75%, of the total depth of the mounting plate.

According to a preferred embodiment of the present invention, it is a fixed mounting plate in which a casting opening extending through the mounting plate is provided for introducing casting material into the casting mold, wherein the dome-shaped cavity tapers towards the casting opening and wherein the casting opening is accessible through the cavity.

In addition to the advantageous weight reduction, which is achieved by providing the dome-shaped cavity described above, the advantage of the embodiment of a fixed mounting plate is that the relatively large dome-shaped cavity increases the accessibility of a casting opening present in the fixed mounting plate. In the case of a conventional fixed mounting plate of a die-casting machine, at most a slightly expanded opening is provided around the casting opening. In the case of larger-dimensioned fixed mounting plates, such as those required for a die-casting machine having a high closing force, the depth (thickness) of the fixed mounting plate also increases. This makes it enormously difficult to access the casting opening, which makes it more difficult to position a casting unit in this casting opening.

In the case of the fixed mounting plate according to the invention, this problem is advantageously solved by providing the dome-shaped cavity described above. The dome shape having a relatively large open base and a shape tapering towards the casting opening permits easy and rapid positioning of a casting unit in the casting opening.

It has been found that the flow of force runs through the mounting plate according to the invention, in particular through certain defined portions of the fixed mounting plate. If these portions are reinforced, a fixed mounting plate according to the invention can withstand increased forces without the need to increase the overall size of the fixed mounting plate for this purpose.

According to the invention, reinforcing elements, preferably ribs, are therefore arranged between the receiving openings on portions of the second side of the fixed mounting plate.

These reinforcing elements preferably extend over the part of the previously described portions that are adjacent to one side of the base of the dome-shaped cavity. According to the invention, it is sufficient for these reinforcing elements to extend over 40-60% of the corresponding portion.

In addition or as an alternative to the reinforcing elements described above, reinforcing elements, preferably ribs, are arranged in the dome-shaped cavity and extend from the base of the cavity towards the casting opening. In other words, these reinforcing elements run crosswise from the base of the cavity to the casting opening.

Both types of reinforcing elements are preferably made of the same material as the fixed mounting plate in order to provide the required reinforcement. According to the invention, these reinforcing elements are particularly preferably provided during the production of the fixed mounting plate, preferably in a casting process in a correspondingly adapted casting mold. The entire mounting plate is therefore integral.

It appears that there is little or no force flow through other portions of the fixed mounting plate of the present invention. This applies in particular to portions between the side walls of the fixed mounting plate and the corresponding walls of the dome-shaped cavity, but also to portions between the walls of the dome-shaped cavity and reinforcing elements that extend from the base of the cavity towards the casting opening. It has been found that material can be removed in these portions of the fixed mounting plate in order to achieve additional weight reduction.

According to a further preferred embodiment of the present invention, recesses are therefore present in the side walls of the fixed mounting plate. The exact size of these recesses can be adjusted depending on the desired closing force and the service life of the fixed mounting plate. In principle, however, it is possible to provide substantial parts in a recessed form in the side regions of the fixed mounting plate without substantially influencing the robustness of the fixed mounting plate, preferably in a casting process for producing the fixed mounting plate in a correspondingly adapted casting mold. The recesses in the respective side walls of the fixed mounting plate can be of the same size or of different sizes.

According to a further preferred embodiment of the present invention, further cavities are present in the fixed mounting plate. These cavities are preferably located in sections between the walls of the dome-shaped cavity and reinforcing elements extending from the base of the cavity to the centroid of the receiving openings on the first side or to the casting opening.

In a preferred embodiment of the present invention having the reinforcing elements described above on portions of the second side of the fixed mounting plate between the receiving openings and/or in the dome-shaped cavity, the recesses and cavities described above can additionally be enlarged.

According to a particularly preferred embodiment of the present invention, the recesses and further cavities are arranged in the fixed mounting plate in such a way that segments of the fixed mounting plate are designed as support elements that extend between a wall of the dome-shaped cavity and a corresponding side wall of the fixed mounting plate.

In other words, the dimensions of the recesses in the side walls of the fixed mounting plate and the dimensions of the further cavities outside the dome-shaped cavity are selected such that they surround segments of the fixed mounting plate, which are thus designed as support elements. This embodiment is optimally designed for weight reduction, force flow and accessibility of the casting opening.

The present invention also relates to a die-casting machine, comprising
  a fixed mounting plate,
  a movable mounting plate,
  guide columns that extend through receiving openings in the fixed mounting plate and receiving openings in the movable mounting plate, and
  a casting unit that extends through the casting opening in the fixed mounting plate.
characterized in that the fixed mounting plate is a mounting plate as described above.

The die-casting machine according to the invention is characterized by the presence of a fixed mounting plate according to the invention described above. As a result, it is designed for very high closing forces. The die-casting machine according to the invention preferably has a maximum closing force of at least 45 000 kN, more preferably at least 50 000 kN and particularly preferably at least 60 000 kN, up to preferably 120 000 kN, more preferably up to 100 000 kN and particularly preferably up to 85 000 kN.

It is preferably a two-platen die-casting machine, although three-platen die-casting machines can also be equipped with the fixed mounting plate according to the invention described above.

According to the invention, cold-chamber die-casting machines are preferred.

According to a preferred embodiment of the present invention, the movable mounting plate is also optimized with regard to its weight and force flow. For this purpose, a movable mounting plate can be used which, as described above, has a dome-shaped cavity, the base of which is located in the second side of the movable mounting plate and is open and which tapers towards the centroid of the receiving openings on the first side of the movable mounting plate.

Preferably, the dome-shaped cavity provided in the movable mounting plate is as described above with respect to the fixed mounting plate. The corresponding statements above apply here analogously.

At least one opening for an ejection unit is usually provided in the tip portion of the dome-shaped cavity in the movable mounting plate. The ejection unit serves to eject a finished casting from an open casting mold. Here too, the accessibility of the corresponding at least one opening is facilitated, for which reason, in the case of a movable mounting plate according to the invention, the ejection unit can advantageously be positioned more easily and quickly in the opening within the cavity of the movable mounting plate.

Similar to the fixed mounting plate according to the invention, the movable mounting plate of the present invention has been found to have little or no force flow through portions of the movable mounting plate of the present invention. This relates in particular to portions between the side walls of the movable mounting plate and the corresponding walls of the dome-shaped cavity. It has been found that material can be removed in these portions of the movable mounting plate in order to achieve additional weight reduction.

In the case of the movable mounting plate according to the invention, not only recesses can be provided in the side walls, but even openings to the dome-shaped cavity. Preferably, according to the invention, side wall openings are present in the side walls of the movable mounting plate and/or dome-shaped wall openings are present in the walls of the dome-shaped cavity of the movable clamping plate. Particularly preferably, the respective openings communicate with one another.

In the case of the movable mounting plate, reinforcing elements can also be provided, as described above for the fixed mounting plate. The corresponding statements above apply here analogously.

According to the invention, intermediate webs are provided on the second side of the movable mounting plate between the receiving openings for the guide columns, wherein the width of the intermediate webs corresponds to 5 to 30% of the distance between two adjacent centers of the receiving openings and the thickness of the intermediate webs corresponds to 5 to 30% of the distance between two adjacent centers of the receiving openings. These intermediate webs permit the transfer of high expansion forces.

Figure 1B:
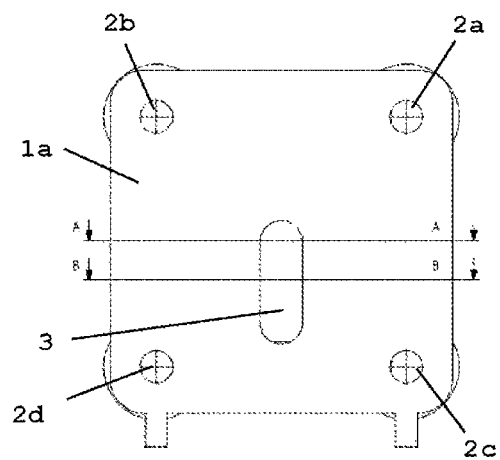
Figure 1C:
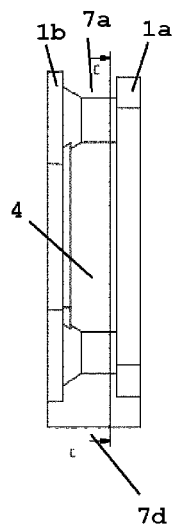
Figure 1D:
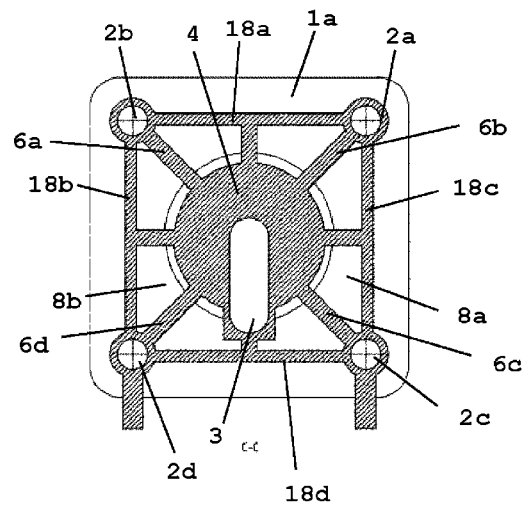
Figure 1E:
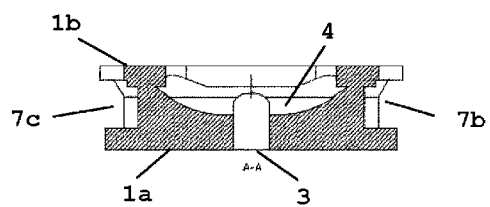
Figure 1F:
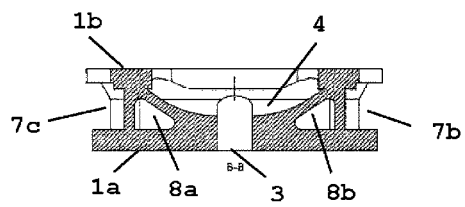
Figure 2:
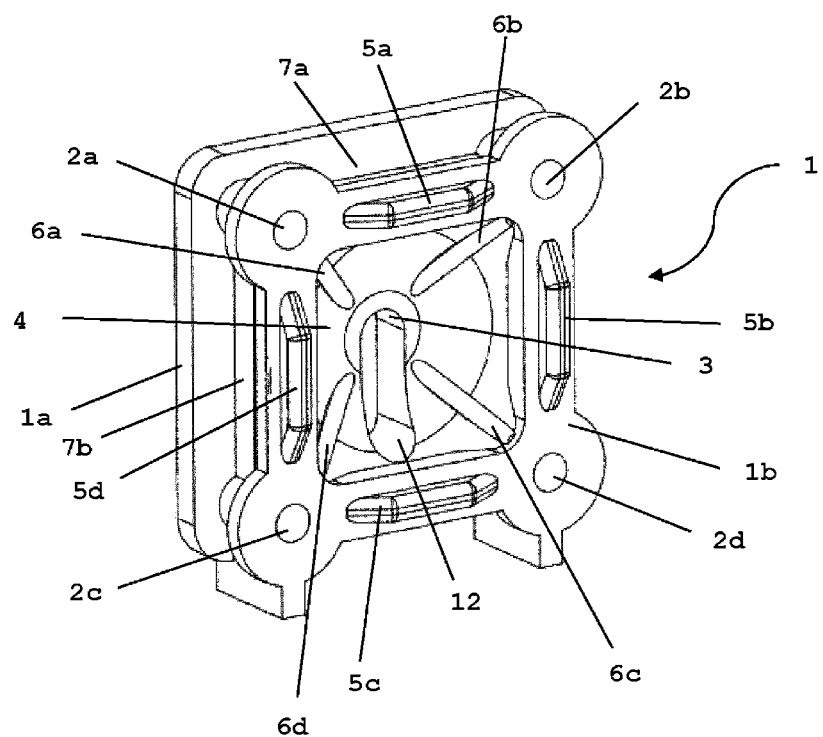
Figure 3A:
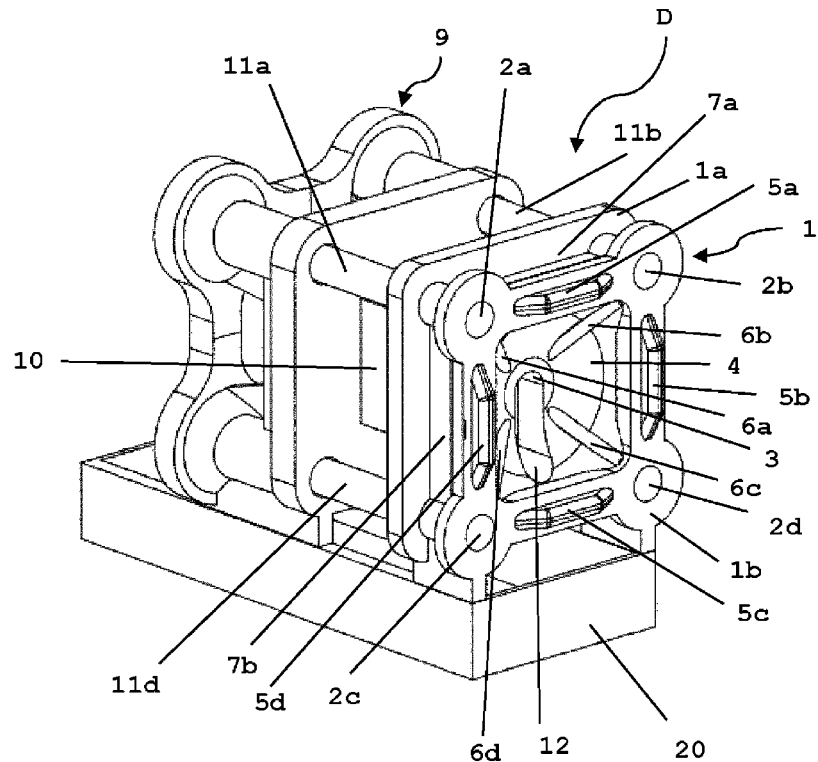
Figure 3B:
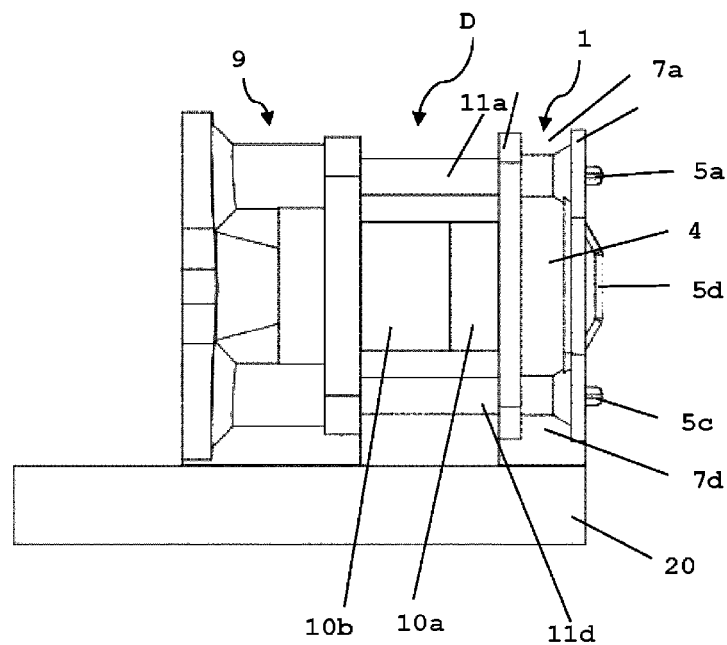
Figure 4A:
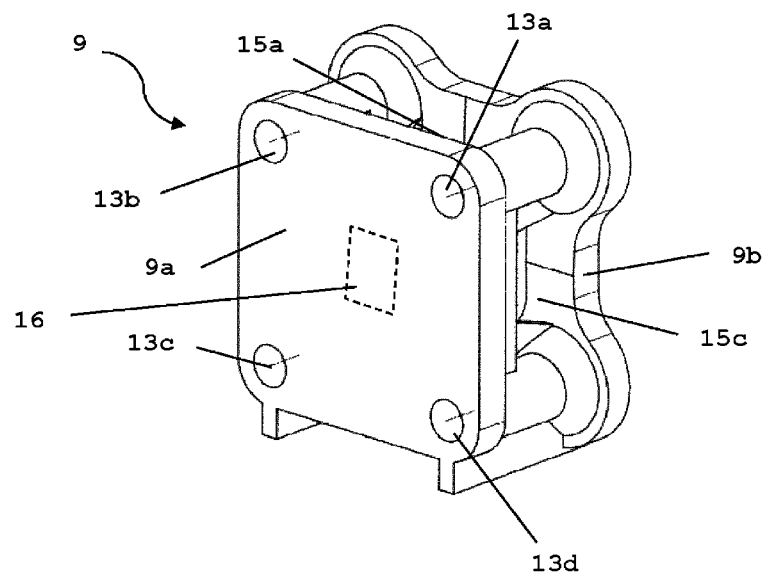
Figure 4B:
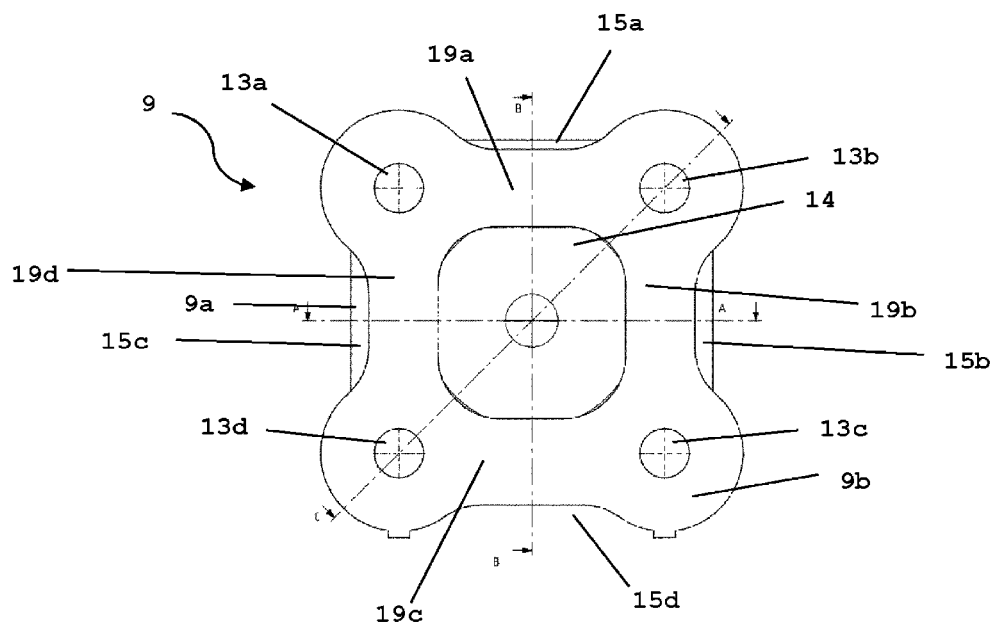
Figure 4C:
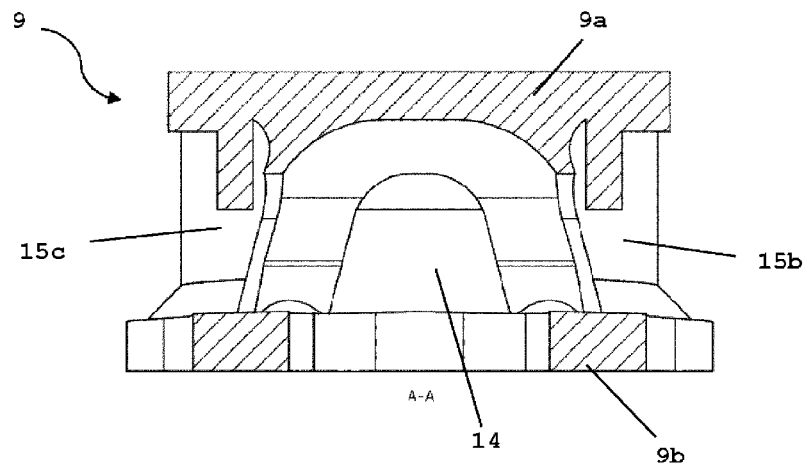
Figure 4D:
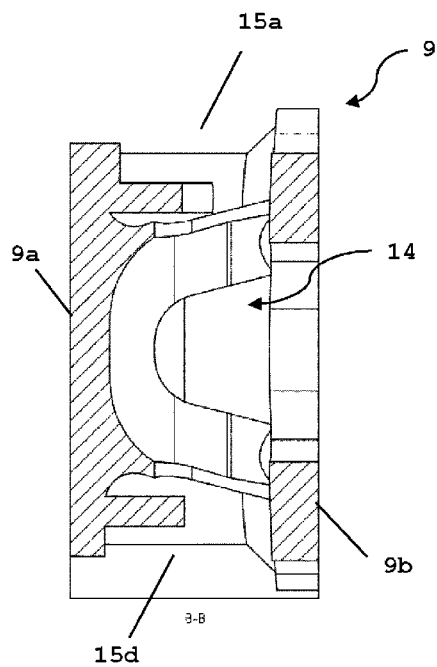
Figure 4E:
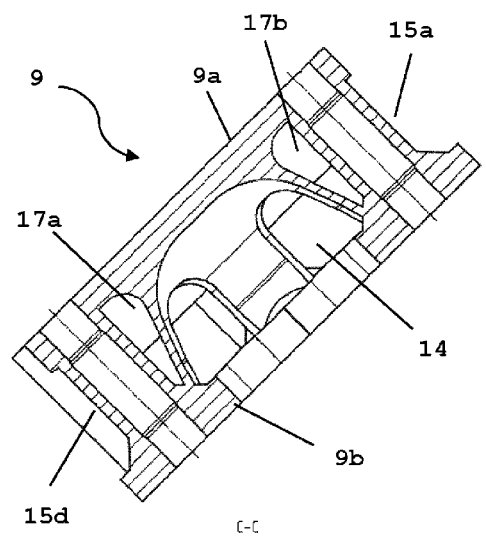

The present invention will be explained in more detail below with reference to preferred embodiments and non-limiting drawings. In the figures:

FIG. 1A is a schematic view of a fixed mounting plate according to one embodiment of the present invention FIG. 1B is a front view of the first side of the fixed mounting plate according to FIG. 1A FIG. 1C is a side view of the fixed mounting plate according to FIG. 1A FIG. 1D is a sectional view along the line C-C in FIG. 1C of the fixed mounting plate according to FIG. 1A FIG. 1E is a sectional view along the line A-A in FIG. 1B of the fixed mounting plate according to FIG. 1A FIG. 1F is a sectional view along the line B-B in FIG. 1B of the fixed mounting plate according to FIG. 1A FIG. 2 is a schematic view of a fixed mounting plate according to a further embodiment of the present invention with reinforcing elements FIG. 3A is a schematic view of a die-casting machine according to a further embodiment of the present invention FIG. 3B is a side view of the die-casting machine according to FIG. 3A FIG. 4a is a schematic view of a movable mounting plate according to one embodiment of the present invention FIG. 4B is a front view of the second side of the movable mounting plate according to FIG. 4A FIG. 4C is a sectional view along the line A-A in FIG. 4B of the movable mounting plate according to FIG. 4A FIG. 4D is a sectional view along the line B-B in FIG. 4B of the movable mounting plate according to FIG. 4A FIG. 4E is a sectional view along the line C-C in FIG. 4B of the movable mounting plate according to FIG. 4A Identical reference signs in different figures indicate the same components.

FIGS. 1A to 1F show an embodiment of a fixed mounting plate 1 according to the present invention. The mounting plate 1 has a first side 1a and a second side 1b. A casting mold (not shown here) can be arranged on the first side 1a by means of fastening devices (not shown here). Receiving openings 2a, 2b, 2c, 2d for guide columns (not shown here) are located in the corners of the fixed mounting plate 1. The receiving openings 2a, 2b, 2c, 2d extend through the entire fixed mounting plate 1.

A dome-shaped cavity 4 is arranged in the fixed mounting plate 1. The base of the dome-shaped cavity 4 is located in the second side 1b of the fixed mounting plate 1 and is open. The dome-shaped cavity 4 tapers towards a (in this case circular) tip portion in which a casting opening 3 is located. As shown in FIG. 1A, a casting unit 12 can be positioned in the casting opening 3. This is easily accomplished due to the dome shape of the cavity 4, as a result of which the casting opening 3 is readily accessible.

Furthermore, it can be seen that recesses 7a, 7b, 7c, 7d are present in the side walls of the fixed mounting plate 1.

Further cavities 8a, 8b are present in the fixed mounting plate 1, which cavities in portions between the walls of the dome-shaped cavity 4 and reinforcing elements 6a, 6b, 6c, 6d, which extend from the base of the cavity to the casting opening.

The recesses 7a, 7b, 7c, 7d and further cavities 8a, 8b are arranged in the fixed mounting plate 1 in such a way that segments of the fixed mounting plate 1 are designed as support elements 18a, 18b, 18c, 18d that extend between a wall of the dome-shaped cavity 4 and a corresponding side wall of the fixed clamping plate 1.

FIG. 2 is a schematic view of a fixed mounting plate 1 according to a further embodiment of the present invention with reinforcing elements 5a, 5b, 5c, 5d and 6a, 6b, 6c, 6d. Reinforcing elements 5a, 5b, 5c, 5d are arranged on portions of the second side 1b of the fixed mounting plate 1 between the receiving openings 2a, 2b, 2c, 2d. Preferably, these are ribs.

In addition, reinforcing elements 6a, 6b, 6c, 6d are arranged in the dome-shaped cavity 4. Preferably, these are ribs. These reinforcing elements 6a, 6b, 6c, 6d extend from the base of the cavity 4 towards the casting opening 3, preferably as shown in FIG. 2 in a cross-shaped manner or along the wall of the dome-shaped cavity 4.

FIG. 3A is a schematic view of a die-casting machine D according to a further embodiment of the present invention. FIG. 3B is a side view of the die-casting machine D according to FIG. 3A.

The die-casting machine D comprises a fixed mounting plate 1, which in this case is a fixed mounting plate 1 of the embodiment according to FIG. 2. The die-casting machine D further comprises a movable mounting plate 9, which is explained in more detail below. The mounting plates 1 and 9 are arranged on a machine frame 20. While the fixed mounting plate 1 is fixedly connected to the machine frame 20, the movable mounting plate 9 can be moved in a known manner on guide columns 11a, 11b, 11c, 11d from an open position to a closed position and vice versa by means of a drive (not shown here) on the machine frame 20. FIGS. 3A and 3B show the movable mounting plate 9 in the closed position. The guide columns 11a, 11b, 11c, 11 d are arranged in receiving openings 2a, 2b, 2c, 2d of the fixed mounting plate 1 and in receiving openings 13a, 13b, 13c, 13d of the movable mounting plate 9.

Between the mounting plates 1 and 9 there is a casting mold 10, which in this case consists of two casting mold halves 10a and 10b.

FIGS. 4A to 4E show an embodiment of a movable mounting plate 9 according to the present invention. The mounting plate 9 has a first side 9a and a second side 9b. A casting mold (not shown here) can be arranged on the first side 9a by means of fastening devices (not shown here). Receiving openings 13a, 13b, 13c, 13d for guide columns (not shown here) are located in the corners of the fixed mounting plate 9. The receiving openings 13*a*, 13*b*, 13*c*, 13*d* extend through the entire movable mounting plate 9. Between the receiving openings 13*a*, 13*b*, 13*c*, 13*d* there are intermediate webs 19*a*, 19*b*, 19*c*, 19*d*.

A dome-shaped cavity 14 is arranged in the movable mounting plate 9. The base of the dome-shaped cavity 14 is located in the second side 9*b* of the movable mounting plate 9 and is open. The dome-shaped cavity 14 tapers towards an (in this case circular) tip portion in which an opening 16 for an ejection unit (shown schematically in dashed lines in FIG. 4A) is located. An ejection unit (not shown here) can be positioned in the opening 16. This is easily accomplished due to the dome shape of the cavity 14, as a result of which the opening 16 is readily accessible.

Furthermore, it can be seen that side wall openings 15*a*, 15*b*, 15*c*, 15*d* are present in the side walls of the movable mounting plate 9.

In the movable mounting plate 9, dome wall openings 17*a*, 17*b* are also present in the walls of the dome-shaped cavity 14. The openings 15*a*, 15*b*, 15*c*, 15*d* and 17*a*, 17*b* communicate with each other so as to provide a continuous opening in the dome-shaped cavity 14.

The invention claimed is:

1. A mounting plate for a die-casting machine, comprising a first side and a second side, wherein a casting mold can be arranged on the first side,
receiving openings for guide columns that are arranged in the corners of the mounting plate,
wherein the mounting plate has a dome-shaped cavity, a base of which is in the second side of the mounting plate and is open and which tapers towards a centroid of the receiving openings on the first side, and wherein a distance from a center of a receiving opening to a closest vertical inner side of the dome-shaped cavity is 5-30% of a distance between a center line extending through the centroid of the receiving openings and the center of a receiving opening.

2. The mounting plate according to claim 1, wherein the dome-shaped cavity has a minimum length and minimum width of a theoretical rectangle in the region of the first side that corresponds to the minimum length and minimum width of a smallest permissible casting mold fastened to the first side of the mounting plate.

3. The mounting plate according to claim 1, wherein the dome-shaped cavity has a depth that is 50-80% of a total depth of the mounting plate.

4. The mounting plate according to claim 1, wherein it is a fixed mounting plate in which a casting opening extending through the mounting plate is provided for introducing casting material into the casting mold, wherein the dome-shaped cavity tapers towards the casting opening and wherein the casting opening is accessible through the dome-shaped cavity.

5. The mounting plate according to claim 4, wherein reinforcing elements are arranged on portions of the second side of the fixed mounting plate between the receiving openings, and/or reinforcing elements are arranged in the dome-shaped cavity, which reinforcing elements extend from the base of the dome-shaped cavity to the centroid of the receiving openings on the first side or towards the casting opening.

6. The mounting plate according to claim 4, wherein recesses are present in the side walls of the fixed mounting plate.

7. The mounting plate according to claim 4, wherein further cavities are present in fixed mounting plate.

8. The mounting plate according to claim 7, wherein recesses and the further cavities are arranged in the fixed mounting plate in such a way that segments of the fixed mounting plate are designed as support elements that extend between a wall of the dome-shaped cavity and a corresponding side wall of the fixed mounting plate.

9. A die-casting machine, comprising
a fixed mounting plate,
a movable mounting plate,
guide columns that extend through receiving openings in the fixed mounting plate and receiving openings in the movable mounting plate, and
a casting unit that extends through the casting opening in the fixed mounting plate
wherein the fixed mounting plate is the mounting plate according to claim 1.

10. The die-casting machine according to claim 9, wherein the movable mounting plate is a mounting plate for a die-casting machine, comprising
a first side and a second side, wherein a casting mold can be arranged on the first side,
receiving openings for guide columns that are arranged in the corners of the mounting plate, wherein the mounting plate has a dome-shaped cavity, the base of which is in the second side of the mounting plate and is open and which tapers towards the centroid of the receiving openings on the first side.

11. The die-casting machine according to claim 9, wherein side wall openings are present in side walls of the movable mounting plate and/or dome-shaped wall openings are present in the walls of the dome-shaped cavity of the movable mounting plate.

12. The die-casting machine according to claim 9, wherein intermediate webs are provided on the second side of the movable mounting plate between the receiving openings for the guide columns, wherein a width of the intermediate webs corresponds to 5 to 30% of a distance between two adjacent centers of the receiving openings and the thickness of the intermediate webs corresponds to 5 to 30% of the distance between two adjacent centers of the receiving openings.

13. The die-casting machine according to claim 8, wherein it is a two-platen die-casting machine.

14. The die-casting machine according to claim 8, wherein the die-casting machine has a maximum closing force of at least 45 000 kN.

15. The die-casting machine according to claim 14, wherein the die- casting machine has a maximum closing force up to 120,000 kN.

\* \* \* \* \*